(No Model.)
H. C. TORREY.
WAGON JACK.
No. 295,509. Patented Mar. 18, 1884.
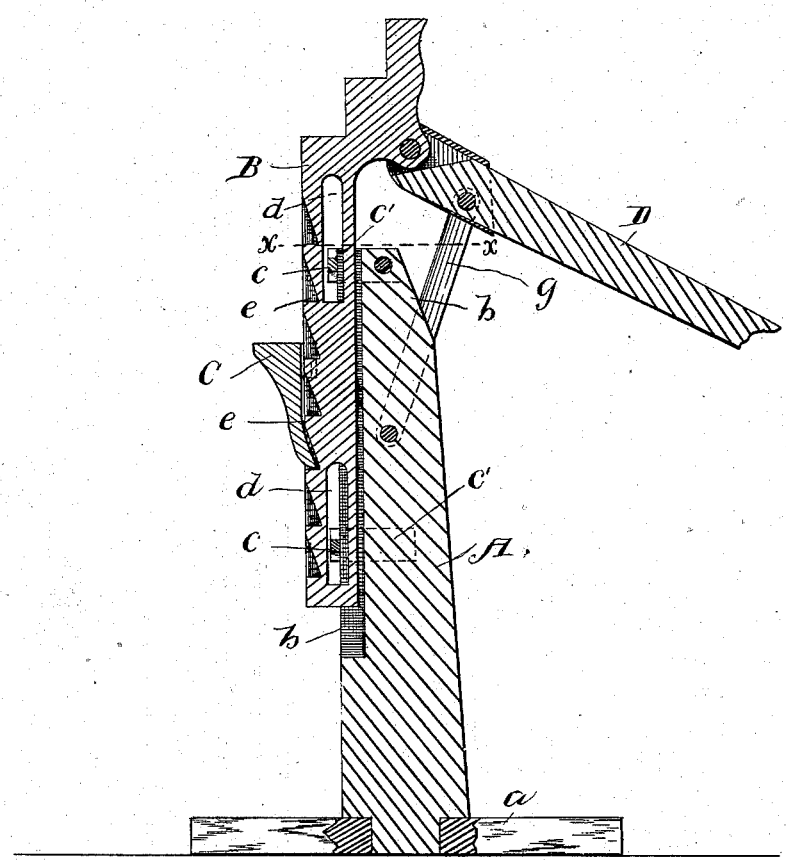
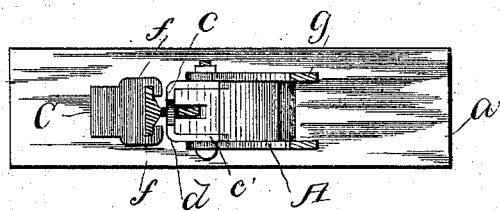
WITNESSES
W. E. Bowen
G. H. Harvey
INVENTOR
Henry C. Torrey
By Myers & Co.
Attorneys

UNITED STATES PATENT OFFICE.

HENRY C. TORREY, OF CENTRAL VILLAGE, CONNECTICUT.

WAGON-JACK.

SPECIFICATION forming part of Letters Patent No. 295,509, dated March 18, 1884.

Application filed January 19, 1884. (No model.)

*To all whom it may concern:*

Be it known that I, HENRY C. TORREY, a citizen of the United States of America, residing at Central Village, in the county of Windham and State of Connecticut, have invented certain new and useful Improvements in Wagon-Jacks, of which the following is a specification, reference being had therein to the accompanying drawings.

This invention pertains to improvements in lifting-jacks, having for its object to effect particularly the lifting of a vehicle-axle and its wheel with facility and convenience; and it consists of the detailed construction and combination of parts, substantially as hereinafter fully set forth and claimed.

In the accompanying drawings, Figure 1 is a sectional elevation of my jack. Fig. 2 is a section on the line $x\ x$ of Fig. 1.

In the organization of my invention I employ an upright standard or support, A, which, for convenience in holding it perpendicularly, is secured in a foot or base, $a$, and which is provided in its front side with a vertical or longitudinal recess, $b$, extending from the upper end of said standard downwardly about two-thirds of the length of the latter.

B is a serially-stepped sliding bar, which fits into the recess $b$ of the standard or upright A, it being held therein by the two cross-bars $c\ c$ of staple-shaped frame $c'$, fastened to the support A, said cross-bars passing through the slots of said sliding stepped bar. In the front surface of the bar B is a series of steps or notches, $e\ e$, with lower beveled surfaces, into which notches takes the lower downwardly and inwardly projecting end of a bracket, C, whose inner upper edge rests against the plain surface on each side of the notches of the bar B. On the sides at the upper end of the bracket C are provided rearwardly-projecting arms $f$, which embrace the flange or cross of a T-shaped surface formed upon the bar B, to permit the adjustment of said bracket to any one of the series of notches $e$ to which it may be desired to adjust it, according to the normal height of the weight or axle preliminary to arranging it thereunder.

The lever D, for raising and lowering the bar B, is pivoted to the angle of the L-shaped upper portion thereof, said lever being preferably recessed or reduced at the point of its pivotal connection with said bar, and connected by parallel links $g$ to the support A, whereby, when the required step of the bar B is placed under the weight or axle and the lever D is forced downwardly, the latter will be moved toward and caused to rest upon an upper beveled surface, $h$, of the support or standard A, at the same time effecting the upward movement of the bar B, which will effect the elevation of the superposed axle or weight and secure the lever in its depressed position while the axle or weight is supported upon the said bar. The simple outward movement of the lever D will permit the release of the stepped supporting-bar from the weight or axle, with which it descends to the normal position or height of the axle or weight, and thereafter, being free of superincumbent pressure, the jack can be readily moved.

The bracket C will, with the notches or steps $e$, adapt the jack to axles of less height than the steps of the bar B are adapted.

Having thus fully described my invention, what I claim, and desire to secure by Letters Patent, is—

1. In a lifting-jack, the combination, with the support having the longitudinal front recess and staple-shaped frames, of the vertically-adjustable stepped bar having slots through which the cross-bars of the frames pass, and the lever pivoted to the angle of an upper L-shaped portion of the stepped bar, and connected by parallel links or plates to the support having an upper beveled end, substantially as described, and for the purpose set forth.

2. In a lifting-jack, the combination, with the stepped sliding bar having the T-shaped front surface, of the bracket with its lower end entering the notches of the steps of the sliding bar, and its upper end provided with arms embracing the cross or flange of said T-shaped surface of the bar, substantially as and for the purpose set forth.

In testimony whereof I affix my signature in presence of two witnesses.

HENRY C. TORREY.

Witnesses:
 NATHANIEL P. THOMPSON,
 EDGAR M. WARNER.